United States Patent
Andrejco et al.

(10) Patent No.: US 6,560,009 B1
(45) Date of Patent: May 6, 2003

(54) ERBIUM DOPED FIBERS FOR EXTENDED L-BAND AMPLIFICATION

(75) Inventors: Matthew Julius Andrejco, Clinton, NJ (US); Inger Pihl Byriel, Vanloese (DK); Bera Palsdottir, Copenhagen (DK)

(73) Assignee: Lucent Technologies Inc., Murray Hill, NJ (US)

( * ) Notice: Subject to any disclaimer, the term of this patent is extended or adjusted under 35 U.S.C. 154(b) by 54 days.

(21) Appl. No.: 09/933,643

(22) Filed: Aug. 21, 2001

(51) Int. Cl.[7] .............................. G02B 6/22; H01S 3/00
(52) U.S. Cl. ..................... 359/343; 359/341.5; 501/42; 501/44; 501/45; 372/6
(58) Field of Search ........................ 359/341.5, 343; 372/6, 40, 68; 385/142; 264/1.24; 501/42, 44, 45, 97.2

(56) References Cited

U.S. PATENT DOCUMENTS

| | | | | |
|---|---|---|---|---|
| 5,412,672 A | * | 5/1995 | Ainslie et al. | 372/6 |
| 5,961,682 A | * | 10/1999 | Lee et al. | 65/384 |
| 6,031,646 A | * | 2/2000 | Sniadower | 359/160 |
| 6,418,757 B1 | * | 7/2002 | Berkey et al. | 65/430 |
| 6,445,494 B1 | * | 9/2002 | Nilsson et al. | 359/341.1 |
| 6,467,313 B1 | * | 10/2002 | Chu et al. | 65/399 |
| 6,474,106 B1 | * | 11/2002 | Crossland et al. | 65/377 |
| 6,477,307 B1 | * | 11/2002 | Takala et al. | 385/127 |
| 6,483,973 B1 | * | 11/2002 | Mazzarese et al. | 385/123 |

\* cited by examiner

*Primary Examiner*—Nelson Moskowitz
(74) *Attorney, Agent, or Firm*—Peter V. D. Wilde

(57) ABSTRACT

The specification describes rare earth doped fiber amplifier devices for operation in the extended L-band, i.e. at wavelengths from 1565 nm to above 1610 nm. High efficiency and flat gain spectra are obtained using a high silica based fiber codoped with Er, Al, Ge, and P and an NA of at least 0.15.

10 Claims, 7 Drawing Sheets

US 6,560,009 B1

ERBIUM DOPED FIBERS FOR EXTENDED L-BAND AMPLIFICATION

FIELD OF THE INVENTION

This invention relates to erbium-doped fibers for photonic devices, and more particularly to erbium-doped fiber amplifiers (EDFA) operating in the L-band.

BACKGROUND OF THE INVENTION

Optical transmission systems employ Wavelength Division Multiplexing (WDM) to increase information handling of an optical fiber transmission line, typically a long haul transmission line. Early WDM systems operated with a relatively narrow wavelength bandwidth, centered around 1550 nanometers, e.g. 1530–1565 nanometers, often referred to as the C-band. This is the wavelength region where standard silica based optical fibers have optimally low absorption.

In most WDM systems there is a trade-off between the number of channels the system accommodates and the channel separation. Both goals favor a wide operating spectrum, i.e. a wide range of operating wavelengths.

Recently, systems have been designed that extend the effective operating wavelength range well above the C-band transmission band. In terms of wavelength, the new band, referred to as the L-band, is variously defined, but for the purpose of this description is 1570–1610 nanometers. Use of these added wavelengths substantially extends the capacity of WDM systems. However, there is an ongoing effort to further extend the effective operating wavelength window, even beyond 1610 nanometers. These efforts are currently focused on the so-called "extended L-band", from 1570 to above 1610 nm, for example to 1620 nm.

Rare-earth-doped fiber amplifiers have found widespread use as amplifiers in WDM communication systems. Typically these amplifiers are erbium doped fiber amplifiers (EDFA). They are easily integrated with long haul fiber cables and can be pumped conveniently using inexpensive multi-mode lasers, such as GaAlAs, with high power, single mode outputs. They can also be made with relatively wide gain bandwidth to achieve some of the goals just mentioned.

WDM systems may also employ dispersion shifted fiber (DSF) which carries more wavelengths in the L-band than in the C-band. Using these advanced design components, EDFAs and DSF transmission lines, dense WDM (DWDM) systems have been developed that are capable of transmitting 40×10 Gbit/s wavelengths in the L-band, providing a 16,000% increase in network capacity. Translated into practical information handling capacity, this system is able to transmit simultaneously the data contained on more than 80 CD ROMs each second.

In WDM systems, it is important to have uniform gain over the entire WDM wavelength band. This objective becomes more difficult to reach as the operating wavelength range is extended to longer wavelengths. Modest non-uniformities in the gain curve may be filtered out by chopping the high gain peaks. However, typical gain curves have curvature over substantial portions of the wavelength band so that chopping the high gain portion may waste a substantial amount of signal. Thus an optical amplifier with relatively uniform, and relatively flat, gain over the L-band, including the extended L-band, would represent an important technological advance in DWDM system design.

Statement of the Invention

A rare-earth doped fiber and fiber amplifier have been developed for operation in the extended L-band. The optical fiber used for this invention incorporates erbium for the basic light amplification function, phosphorus to selectively enhance gain at the target wavelengths in the extended L-band, germanium to provide a high numerical aperture (NA) and aluminum to solubilize the other additives. The amount of aluminum is controlled to below that of phosphorus, and generally below 4%, to maintain flatness of the gain curve. The actual functions of these additives are partly interchangeable, and the precise role of each has not been thoroughly investigated. But the effect of the additives in the combinations described below has been established.

Optical fibers produced according to the invention exhibit a flat gain profile that extends out to at least 1620 nanometers, thus broadening the bandwidth of the L-band by more than 20%

DETAILED DESCRIPTION

Figure 1:
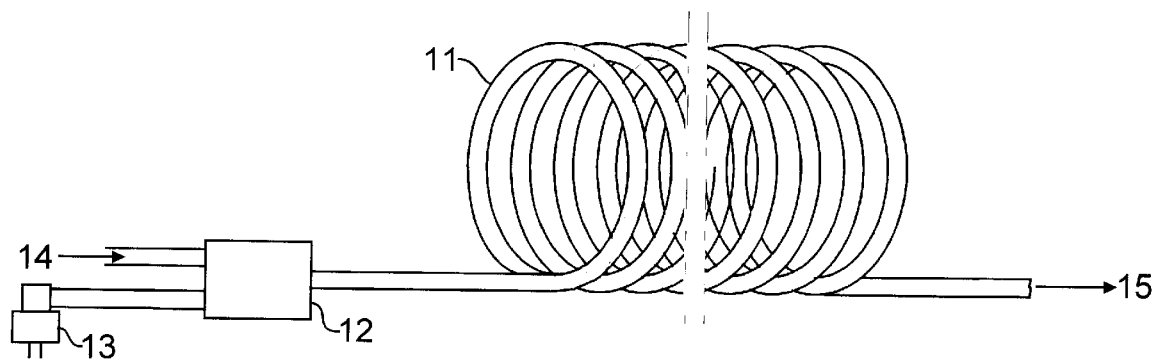
FIG. 1 is a schematic representation of an optical fiber amplifier.

Referring to FIG. 1, an optical fiber amplifier structure is shown with optical fiber coil 11, with a portion of the coil cut away to depict substantial length. It will be evident to those skilled that the figures in this description are not drawn to scale, and the elements are schematically shown. The length of the fiber in these structures is usually of the order of tens of meters, so the fiber in the figure represents many turns. The fiber can be supported on a variety of mandrel structures which may be round or oval.

The amplifier may be end pumped as shown in the figure using laser pump 13 coupled into the core of the fiber through coupler shown schematically at 12. A counter pump (not shown) may be coupled to the output end of the amplifier. Typical pump wavelengths are around 980 and 1480 nanometers, but can also be at other wavelengths. The signal input is represented by 14, and the amplified signal output is shown at 15. In principal, because it is end-pumped as shown, the fiber 11 can be strung out over its length or substantial portions of its length.

Figure 2:
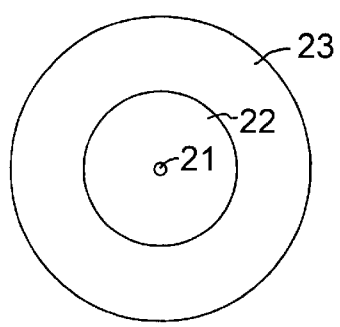
FIG. 2 is an end view of the fiber in the amplifier of FIG. 1.

Referring to FIG. 2, an end of the optical fiber amplifier is shown. This view is also representative of a cross section taken at any position along the fiber. The fiber laser comprises a core 21 and a cladding 22. The core of the fiber has a composition in accordance with the invention as will be described below. The cladding layer is preferably a high silica material, i.e. at least 85% $SiO_2$. In some preferred structures it may be pure silica.

The dimensions of the structure shown in FIG. 2 may vary substantially. The cladding layer diameter is typically in the range 50–400 µm, and preferably 70–300 µm.

The structure shown in FIG. 1, and the optical fiber to be described below, bear resemblance to the optical fiber laser described and claimed in U.S. Pat. No. 5,937,134, issued Aug. 10, 1999 to David J. DiGiovanni. However, the similarity in large part results from the fact that the dominant element of many optical fiber amplifiers and many optical fiber lasers is a rare earth doped optical fiber. The overall design of the fiber and its properties are significantly different. Moreover, the optical fiber laser is provided with a resonant cavity formed usually by Bragg reflector gratings. The amplifier device of the invention operates on a traveling wave principle and a resonant cavity is not required. Also, the laser does not have an encoded input and output. The amplifier fiber is designed to amplify many wavelengths simultaneously.

In an EDFA device, the gain of the amplifier is a function of the length of the active optical fiber element, and the gain curve can be calculated using the absorption and gain coefficients as:

$$g(\lambda) = L\left[(\alpha(\lambda) + g^*(\lambda))\frac{\langle n_2 \rangle}{n_t} - \alpha(\lambda)\right]$$

where $\alpha(\lambda)$ and $g^*(\lambda)$ are the absorption and gain coefficients, respectively, $\langle n_2 \rangle$ is the average inversion, $n_t$ is the total number of Er ions, and L is the length of the fiber.

Figure 3:
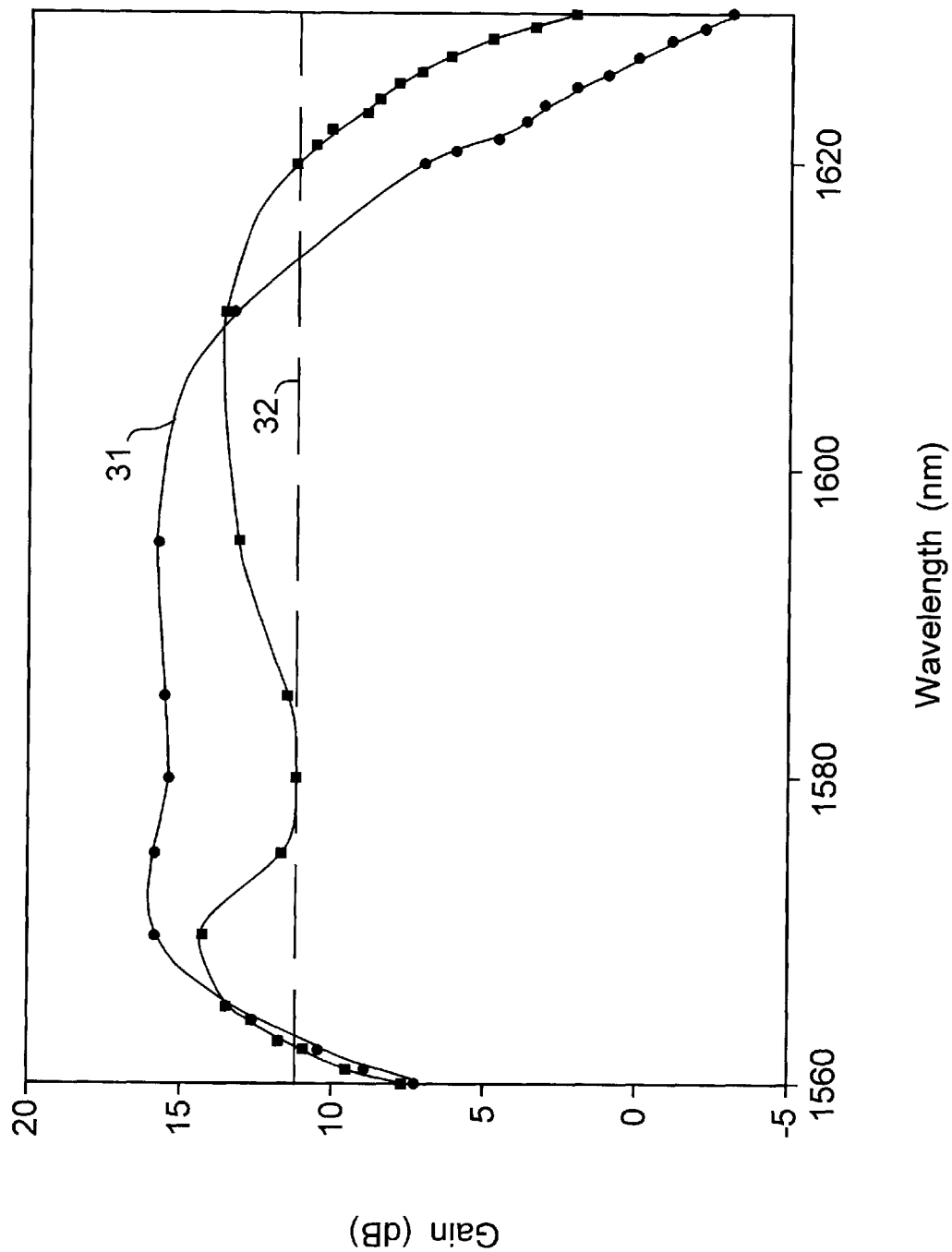
FIG. 3 is a plot of gain vs. wavelength for the rare-earth doped fiber amplifier of the invention and comparing it with the gain curve of a standard L-band fiber amplifier.
Figure 4:
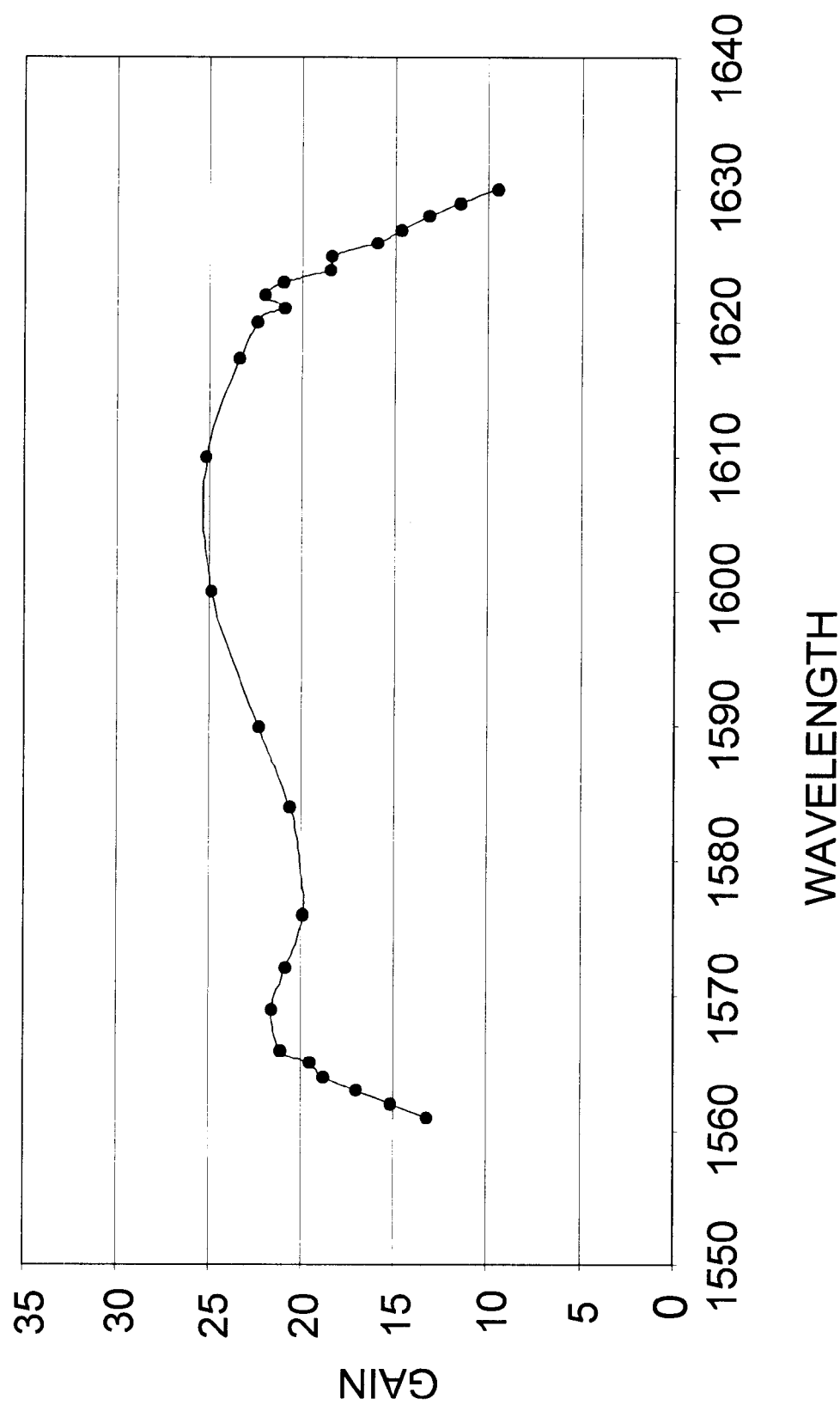
FIGS. 4–8 are gain curves for several examples of fiber amplifier devices according to the invention.
Figure 5:
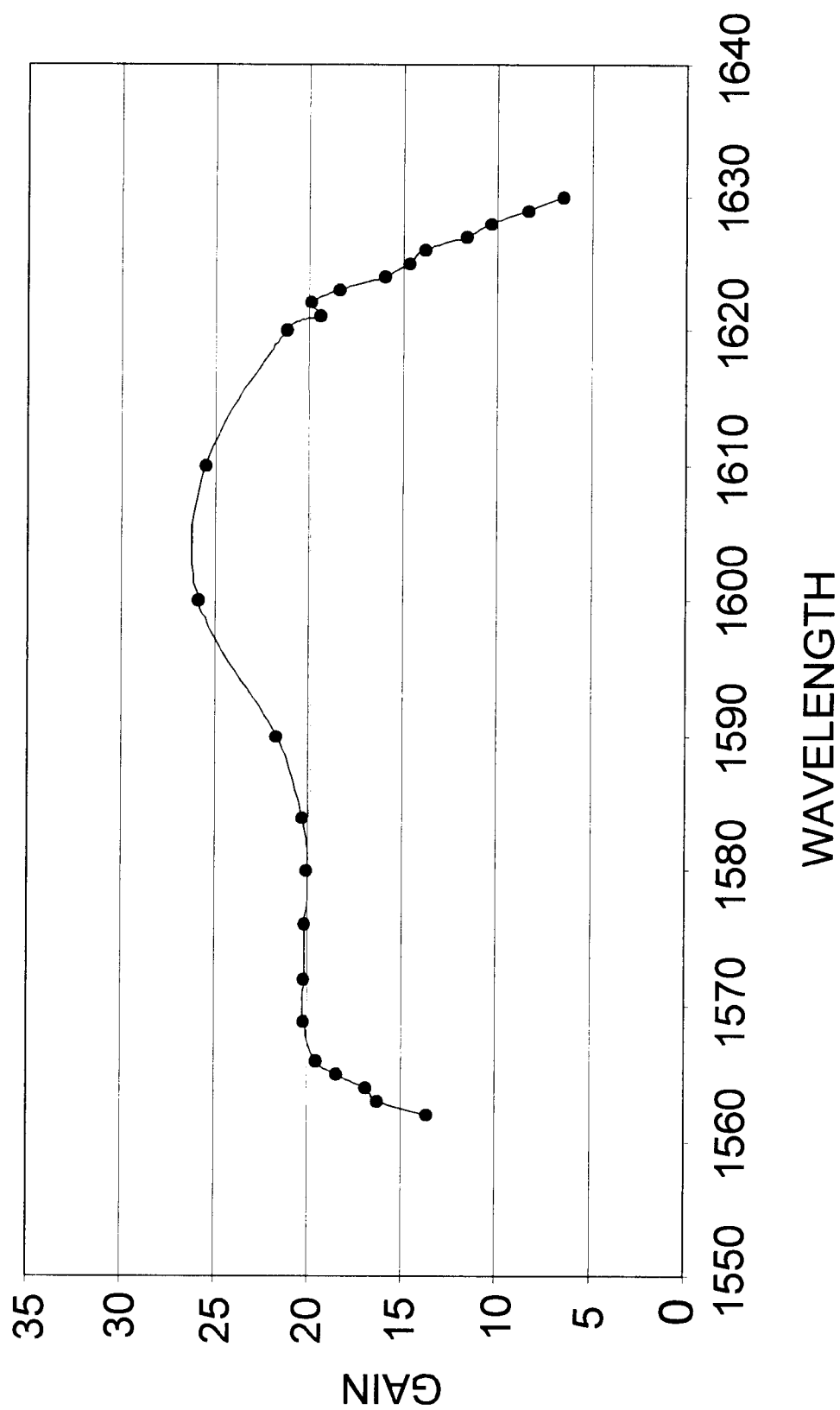
Figure 6:
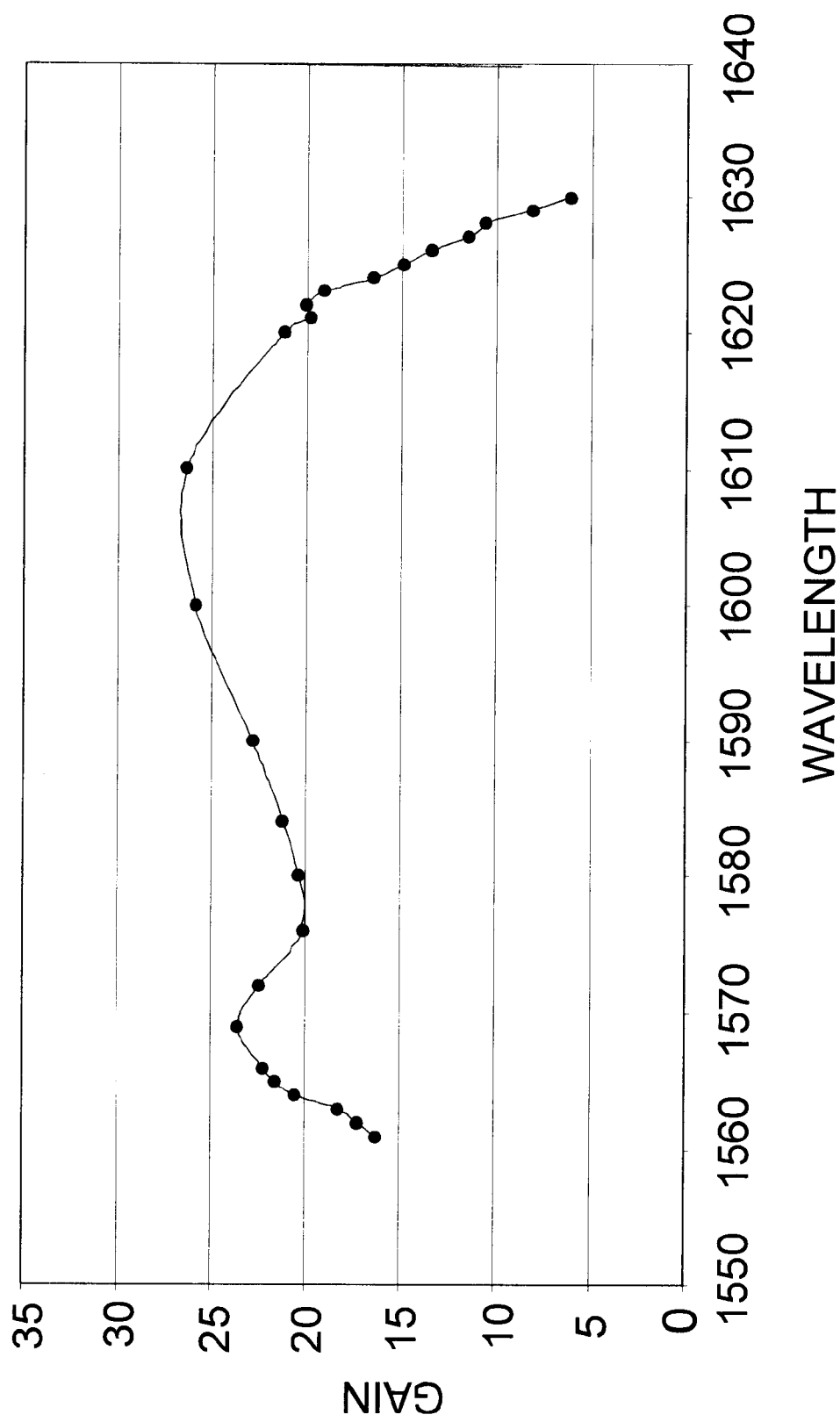
Figure 7:
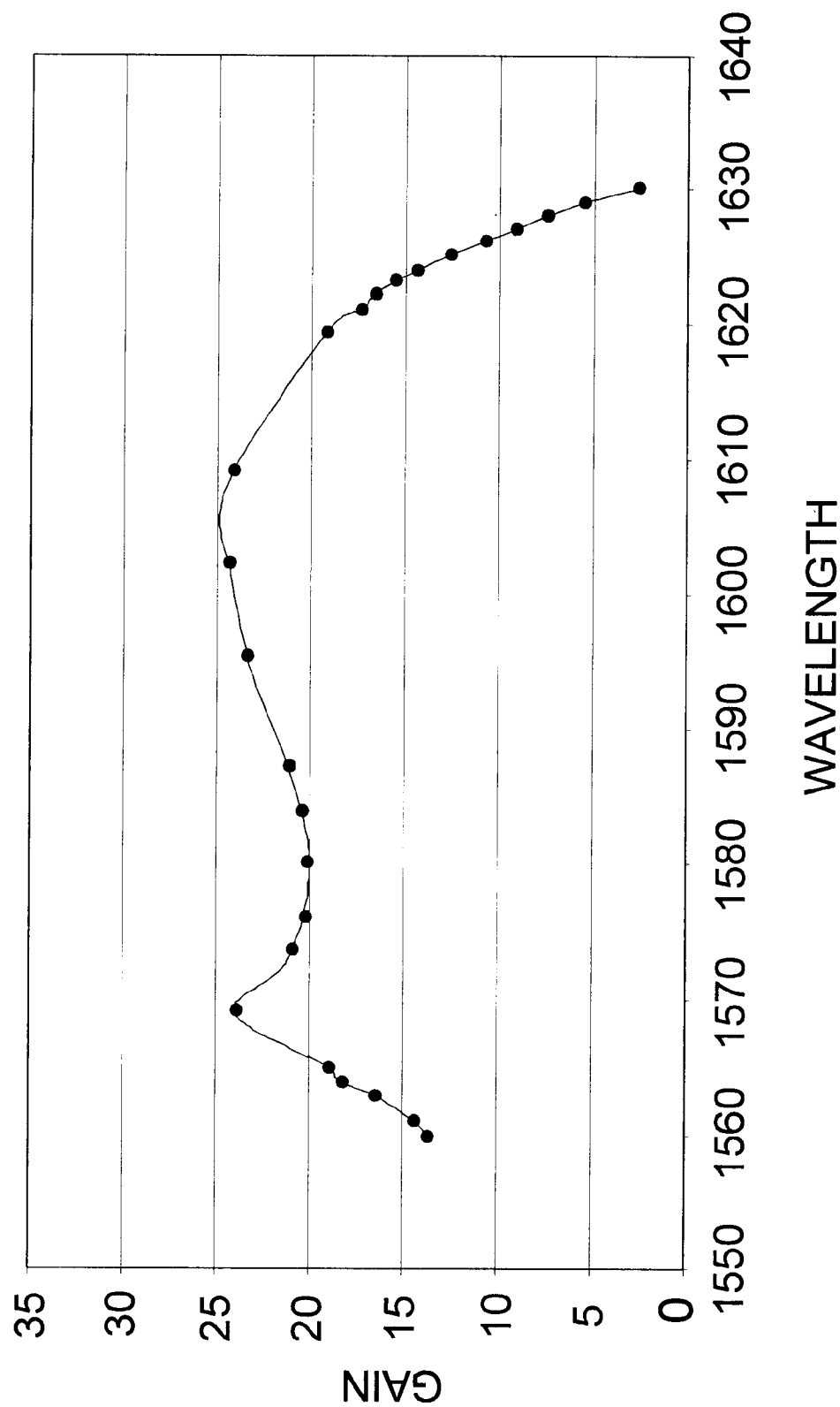
Figure 8:
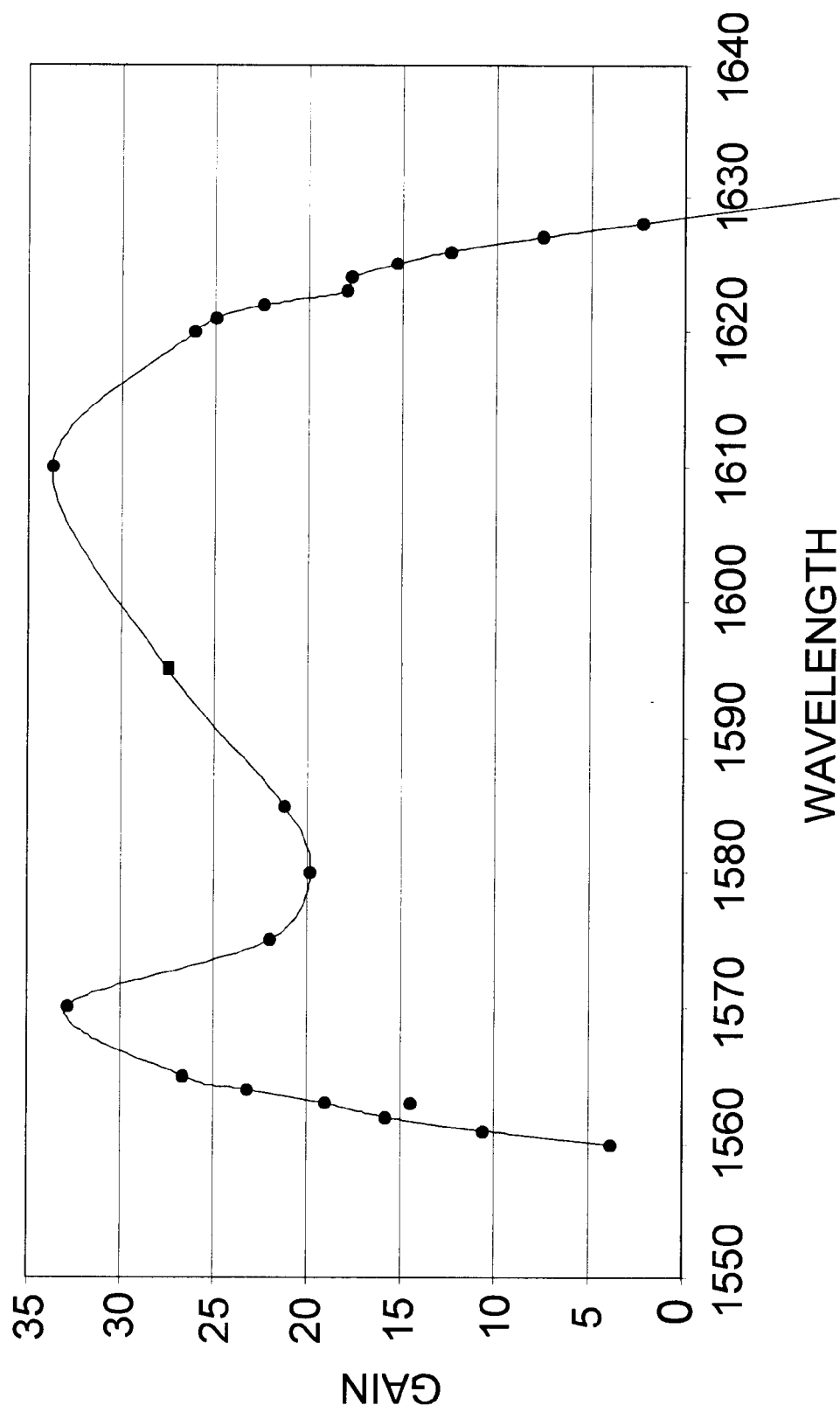

Using this relationship, gain curves for EDFA devices can be calculated and analyzed for L-band performance. The various parameters can be adjusted to determine the effect on the gain curve and, especially, on the performance at wavelengths above 1610 nanometers. Using this modeling technique, high performance EDFA devices can be obtained, but all are found to have a steep drop off in gain at wavelengths above 1610. This is shown in FIG. 3, where the dashed curve 31 represents actual measurements on a successful EDFA design but shows the sharp drop in gain above 1600 nanometers. The dashed line 32 is arbitrarily chosen at 11 dB as a desirable minimum target over the wavelength shown.

According to the invention, the core of the fiber is doped with erbium to provide amplification and optimize gain per unit length of fiber. Er doping levels of 0.01 to 0.1 mol % are recommended. To prevent concentration quenching due to the high erbium level, aluminum is added which raises the efficiency of the amplifier to acceptable levels. An Al doping level of 0.5–8.0% is recommended. However, care must be exercised in aluminum doping as high levels of aluminum cause rippling in the gain curve. If in increasing the magnitude of the gain the gain curve becomes unacceptably rippled, then the advantage of higher overall gain is offset by the need to filter out excessive ripples. Therefore we have found that the aluminum concentration is preferably kept below about 4 mol %.

The shape of the gain curve is then tuned by codoping the core with germanium and phosphorus. Germanium concentration may vary over a moderately wide range of 0–12% but will generally be 0.1–10% and preferably above 6% to provide the desired high NA. High NA reduces the susceptibility of the fiber to bending losses. Lower germanium content may be used in fibers with depressed cladding, i.e. down-doped (fluorine doped) cladding. This expedient may be used to maintain a relatively high NA but keep the overall additive level low.

For a flat gain spectrum, we have found that phosphorus should be included at a concentration in excess over the concentration of Al. Therefore the phosphorus concentration in most cases will be in the range 1.0–10 mol %, and preferably 5–10 mol %. Aluminum counteracts the index-modifying effect of phosphorus and consequently a large excess of phosphorus, or phosphorus plus germanium, is desirable to provide a relatively high core Δ. The objective in general is to produce, using the codoping technique just described, a core Δ of at least 0.005, but preferably greater than 0.008. Best results are obtained with a core Δ of at least 0.012. Core Δs of 0.008 and 0.012 correspond approximately to NAs of 0.15 and 0.19 respectively (based on pure silica as the first cladding material).

The following table shows several examples of optical fibers useful for the practice of the invention. The core compositions and properties are given by way of demonstrating the effectiveness of the invention and it should be understood that these are in no way limiting of the scope of the invention. In each case the host material is silica, and the core Δ is calculated based on silica as the first cladding layer.

TABLE I

| Fiber | $GeO_2$ (mole %) | $Al_2O_3$ (mole %) | $SiO_2$ (mole %) | $P_2O_5$ (mole %) | $La_2O_3$ (mole %) | Δ | NA ($\sqrt{2*1.458*\Delta n}$) |
|---|---|---|---|---|---|---|---|
| A | 2 | 2.8 | 89.3 | 5.9 | | 0.0064 | 0.13 |
| B | 0.4 | 0.9 | 93.9 | 4.8 | | 0.0059 | 0.13 |
| C | 7.85 | 2.75 | 83.54 | 5.27 | 0.59 | 0.015 | 0.21 |
| D | 6.71 | 3.39 | 83.95 | 5.37 | 0.58 | 0.0145 | 0.21 |
| E | 4.95 | 4.87 | 82.76 | 7.75 | | 0.01 | 0.17 |
| F | 7.85 | 2.75 | 84.13 | 5.27 | | 0.0137 | 0.20 |
| G | 6.71 | 3.39 | 84.53 | 5.37 | | 0.0124 | 0.19 |

These fibers have a core diameter of 3–7 $\mu$m and cutoff wavelengths between 900 and 1600 nm. The inner cladding was 125 $\mu$m in diameter.

Amplifier devices were made using these fiber compositions to explore the effects of composition on the gain spectra. Results of amplifier measurements are given in the following table. Gain ripple is defined as (Gmax-Gmin)/Gmin.

TABLE II

| Fiber | Gain Ripple % | C-Band Efficiency |
|---|---|---|
| A | 27 | 0.2 |
| B | 32 | 0.16 |
| C | 32 | 0.31 |
| D | 30 | 0.41 |
| E | 70 | 0.33 |
| F | 32 | 0.31 |
| G | 30 | 0.41 |

The gain spectra for the examples A–E in Tables I and II were plotted as gain vs. wavelength and are shown in FIGS. 4–8 respectively. The numerical gain is arbitrary and can be fixed at any chosen level by adjusting one or more of the device length, the erbium concentration, and the pump properties.

To meet the overall objective of the invention the gain ripple should be 70% or less, and preferably less than 40%, in the wavelength range 1565–1620 nm, where gain ripple is defined as above.

The optical fibers used for these demonstrations were prepared by standard MCVD, combined with solution doping. Germanium was incorporated in the soot layer. Phosphorus was incorporated by consolidating the preform in a $POCl_3$ atmosphere. Aluminum and erbium were introduced by solution doping using $AlCl_3$ and $ErCl_3$. A typical preform was prepared using 1.2 g/min $SiCl_4$, 1.2 g/min $GeCl_4$ in the soot despoition, 250 sccm $POCl_3$ during sinter, and 120 g/l $AlCl_3.6H_2O$ and 1.5 g/l $ErCl_3.6H_2O$ in the solution The nominal composition produced was 7mol % $GeO_2$, 3.4 mol % $Al_2O_3$, and 5.4 mol % $P_2O_5$, and the nomial core Δ was 0.012, corresponding to an NA Of 0.19.

The rare earth used in most of these examples, and the preferred rare earth for the invention, is erbium. Additions of lanthanum were made in examples C and D to demonstrate that other additives, preferably rare earth additives, may be used in combination with germanium to raise the NA and the efficiency of the fiber.

In addition to the constraints given above for the ranges of ingredients, the overall index variation, i.e. the core Δ, should be controlled to achieve the goal of the invention. The combined mole % of the dopants should be consistent with producing an overall NA value of at least 0.1415, and preferably 0.19 or greater.

The pump diode used in these demonstrations was a relatively broad band GaAlAs device. However, other semiconductor laser pump sources such as InGaAs or InGaAsP can be substituted. Semiconductor pump lasers are preferred but other pump sources, e.g. Nd-glass, Ti-sapphire, can be used.

As known to those skilled in the art, optical fiber amplifiers may be used "in-line" to amplify a multiplexed signal, e.g. a signal with wavelengths across both the L-band and the C-band, in which case the flat gain band characteristics described above are important. These amplifiers may also be used to amplify a signal from a single channel, i.e. after demultiplexing. In the latter case the input signal may have a relatively narrow signal of wavelength up to 1620 nm or more. However, the flat gain characteristics of the amplifier are also important in this application so that amplifiers for different channels do not require separate gain adjustment. The term signal as used here is meant to imply that the light being transmitted is encoded with information. However, the amplifier of the invention may be used for unmodulated signals, e.g. laser source devices. In each case, to gain the advantages of the invention, the input will contain a wavelength above 1610 nm.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Fiber amplifier comprising:
    a. a length of glass fiber with a core, and a cladding,
    b. lightwave input means for introducing a lightwave signal into the core of the glass fiber,
    c. optical pump means for introducing lightwave pump energy into the core of the glass fiber, the invention characterized in that the composition of the core of the glass fiber in mole percent is:
    0.01–2.0 Er
    0–12.0 Ge
    0.5–8.0 Al
    1.0–10.0 P
    remainder $SiO_2$,
    the invention further characterized in that the difference between the refractive index of the core and the refractive index of the cladding is greater than 0.008.

2. The fiber amplifier of claim 1 in which the ratio of the mol % of P to the mol % of Al is greater than 1.

3. The fiber amplifier of claim 1 further including 0.1–10.0 mol % of La.

4. The fiber amplifier of claim 1 wherein the lightwave signal contains at least one wavelength greater than 1610 nm.

5. The fiber amplifier of claim 1 in which the difference between the refractive index of the core and the refractive index of the cladding layer is greater than 0.012.

6. The fiber amplifier of claim 1 wherein the gain ripple in the wavelength range 1565–1620 nm is less than 70%.

7. Fiber amplifier comprising:
    a. a length of glass fiber with a core, and a cladding,
    b. lightwave input means for introducing a lightwave signal into the core
    of the glass fiber, the lightwave signal containing at least one wavelength greater than 1610 nm,
    c. optical pump means for introducing lightwave pump energy into the core of the glass fiber, the invention characterized in that the composition of the core of the glass fiber in mole percent is:
    0.01–2.0 Er
    6.0–12.0 Ge
    0.5–4.0 Al
    5.0–10.0 P
    remainder $SiO_2$,
    the invention further characterized in that the NA of the fiber is 0.19 or greater.

8. The fiber amplifier of claim 7 in which the ratio of the mol % of P to the mol % of Al is greater than 1.

9. The fiber amplifier of claim 7 further including 0.1–10.0 mol % of La.

10. The fiber amplifier of claim 7 wherein the gain ripple in the wavelength range 1565–1620 nm is less than 70%.

* * * * *